United States Patent [19]

James et al.

[11] 4,286,732

[45] Sep. 1, 1981

[54] VARIABLE RATIO DISPENSING APPARATUS

[75] Inventors: James R. James, Novi, Mich.; Michael P. Neathery, Louisville, Ky.

[73] Assignee: Accuratio Systems, Inc., Novi, Mich.

[21] Appl. No.: 30,062

[22] Filed: Apr. 16, 1979

[51] Int. Cl.³ .................. B67D 5/22; F04B 23/04; F04B 41/06

[52] U.S. Cl. .................. 222/46; 222/135; 417/429

[58] Field of Search .............. 222/134, 46, 135, 137, 222/333; 137/99, 567; 417/429; 74/675

[56] References Cited

U.S. PATENT DOCUMENTS

| | | | |
|---|---|---|---|
| 2,845,867 | 8/1958 | Shoosmith | 137/99 X |
| 2,940,337 | 6/1960 | Icalb | 74/675 |
| 3,223,040 | 12/1965 | Dinkelkamp | 222/134 UX |
| 3,298,238 | 1/1967 | Lea | 417/429 X |
| 3,304,869 | 2/1967 | Blume | 417/429 |
| 3,390,815 | 7/1968 | Kavan et al. | 222/46 X |
| 3,575,065 | 4/1971 | Kell | 74/675 X |
| 4,150,769 | 4/1979 | James | 222/333 X |

Primary Examiner—Robert J. Spar
Assistant Examiner—Edward M. Wacyra

[57] ABSTRACT

Dispensing apparatus with a pain of fluid dispensing cylinders each having a piston driven through a separate differential transmission with two inputs. One of the inputs of both transmissions is driven by a first electric motor. The other inputs are connected to counterrotating output shafts of a gear box driven by a variable speed second electric motor to introduce unlike inputs into the differential transmissions so that the ratio of fluid dispensed by the cylinders is varied by operation of the second motor in different directions and at different speeds. During the return stroke of the pistons the second motor is operated at a rate higher than its rate during the dispensing stroke so that any difference in the length of the dispensing stroke of the pistons is reduced to zero before the pistons home, whereupon the second motor is de-actuated and the first motor alone homes the pistons to prevent the pistons from getting out of phase.

13 Claims, 1 Drawing Figure

U.S. Patent
Sep. 1, 1981
4,286,732
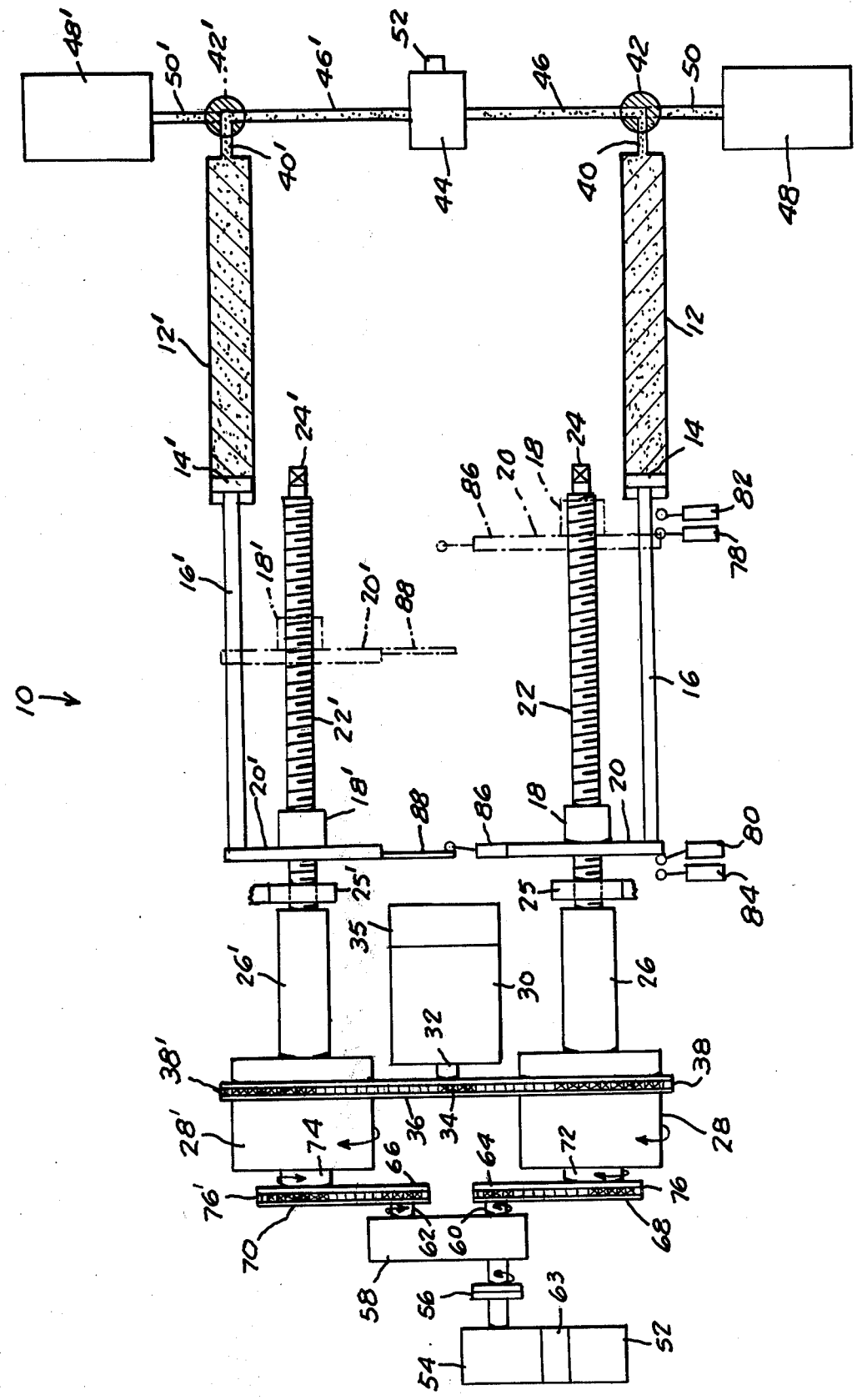

VARIABLE RATIO DISPENSING APPARATUS

This invention relates generally to apparatus for dispensing a plurality of fluids from a corresponding plurality of cylinders by means of relative movement between the cylinders and the pistons therein. More particularly, the invention involves apparatus of this type which incorporates means for varying the ratio of dispensing from the cylinders. By way of example, such apparatus is particularly useful in mixing the component fluids of polyurethane material since it is frequently necessary to change the ratio of the components to make products having different physical characteristics.

In conventional apparatus of this type the various cylinder and piston assemblies are powered by a common motor and the ratio of dispensing is determined by gearing interposed between the motor and the final drive for the cylinder and piston assemblies. One disadvantage of this arrangement is that in order to change the ratio of dispensing, gears in the drive train must be changed which at best is a somewhat time consuming operation resulting in down time for the apparatus. Another disadvantage is that the ratio of dispensing cannot be changed while the apparatus is in operation.

Objects of the present invention are to provide a relatively simple and inexpensive variable ratio dispensing apparatus which is improved to eliminate the above-mentioned disadvantages.

The accompanying drawing is a diagrammatic plan view of an apparatus embodying this invention.

Shown in the drawing is an apparatus 10 according to the present invention having a pair of dispensing cylinders 12 and 12' each having a piston 14 and 14' advanced and retracted therein by a piston rod 16 and 16' attached to a nut 18 and 18' through a cross head 20 and 20', the nut being driven by a ball screw 22 and 22'. Each screw 22 and 22' is supported at one end by a bearing 24 and 24' and at its other end is supported by a bearing 25 and 25' and connected to the output shaft 26 and 26' of a differential transmission 28 and 28'. Transmissions 28 are conventional and can comprise, for example, planetary gear boxes or line shaft phase shifters. The prime mover for transmissions 28 and 28' is an electric motor 30, preferably alternating current, having an output shaft 32 with a gear 34 thereon and a built-in brake 35. A gear chain 36 or the equivalent is entrained around gear 34 and around gears 38 and 38' on the outer, barrel type input shafts of transmissions 28 and 28'.

When motor 30 is operated in one directon, ball screws 22 and 22' through transmissions 28 and 28' are rotated to move nuts 18 and 18' from the solid line position of the drawing to the right for advancing pistons 14 and 14' to dispense fluids from cylinders 12 and 12'. When motor 30 is reversed, nuts 18 and 18' are drawn toward the left by ball screws 22 and 22' to retract pistons 14 and 14' in cylinders 12 and 12'. Cylinders 12 and 12' each have a combined inlet-outlet 40 and 40' connected into a three-way valve 42 and 42' which in one position (solid lines in the drawing) connects the interior of cylinders 12 and 12' with a mixing head 44 through conduits 46 and 46'. In another position of valves 42 and 42' (dotted lines) the interior of cylinders 12 and 12' are connected with sources of fluid 48 and 48' such as supply tanks through conduits 50 and 50'.

When valves 42 and 42' are in the solid line positions and pistons 14 and 14' are advanced, fluids within cylinders 12 and 12' are dispensed through outlets 40 and 40', valves 42 and 42', and conduits 46 and 46' into mixing head 44 from which the mixed fluids emerge through a nozzle 52. When valves 42 and 42' are shifted to the dotted line position and pistons 14 and 14' are retracted, fluids are drawn from sources 48 and 48' through conduits 50 and 50', valves 42 and 42' and inlets 40 and 40' into cylinders 12 and 12' for refilling the cylinders preparatory to a subsequent dispensing cycle of operation.

A second, variable speed electric motor 52, preferably direct current, operates a speed reducer 54 and an output shaft 56 therefrom to drive a gear box 58 in turn having two output shafts 60 and 62 which rotate in opposite directions. Motor 52 has a built-in brake 63. Gears or pulley wheels 64,66 are mounted on shafts 60,62, respectively, and drive corresponding gears or pulley wheels 68,70 on secondary input shafts 72,74 for transmissions 28 and 28' through suitable belting, timer chains or the equivalent 76 and 76'.

A pair of electric switches 78,80 are mounted to be tripped by the cross head 20 at the end of the dispensing stroke and retracting stroke, respectively, of the piston rod 16. Switches 78,80 can be mounted in a known manner for adjusting their positions longitudinally of piston rod 16 for adjusting the length of the dispensing stroke of piston 14. A second pair of electric switches 82,84 are mounted to be tripped by cross head 20 at the extremities of the intended movement of the cross head for safety purposes. Cross head 20 has a switch 86 mounted in the path of movement of a finger 88 carried by the other cross head 20' for a purpose to be described.

In use, it will be assumed that initially nuts 18 and 18' cross heads 20 and 20', piston rods 16 and 16', and pistons 14 and 14' are in the retracted position shown in solid lines in the drawing. Cylinders 12 and 12' are filled with fluids drawn from reservoirs 48 and 48'. Valves 42 and 42' are in the solid line positions so that the interiors of cylinders 12 and 12' are in communication with mixing head 44. In a typical apparatus 10, if the fluids are to be dispensed from cylinders 12 and 12' at the same rate, motor 52 is left at rest so that secondary input shafts 72,74 remain stationary. Then, when motor 30 is actuated screws 22 and 22' are rotated at the same rate, thereby advancing nuts 18 and 18', cross heads 20 and 20', piston rods 16 and 16' and pistons 14 and 14' at the same rate in their dispensing stroke.

When the pistons reach the forward ends of their dispensing strokes the cross head 20 trips switch 78, thereby reversing the direction of motor 30. At this time both cross heads will have advanced the same distance along screws 22 so that they remain in the relation illustrated in solid lines in the drawing. When switch 78 is tripped, it actuates suitable circuitry for shifting valves 42 and 42' from the solid line position to the dotted line position shown in the drawing, thereby cutting off communication between the interiors of cylinders 12 and 12' and the mixing head 44 and placing the interiors of the cylinders in communication with fluid reservoirs 48 and 48'. Cross heads 20 and 20' retract at the same rate and remain in the relation illustrated in solid lines in the drawing and, during this retracting movement, pistons 14 and 14' draw fluids from reservoirs 48 and 48' into the interiors of cylinders 12 and 12'. At the end of the retracting movement, the cross head 20 trips switch 80 to deactuate motor 30 and return valves 42 and 42' to the solid line position shown in the drawing.

At the end of both the dispensing stroke and retracting stroke, brake 35 is operated to halt movement of motor 30 and the components driven thereby. Should either switch 78 or switch 80 fail to function properly, the cross head 20 will trip switch 82 or 84, respectively, to interrupt the circuitry to motor 30, thereby providing a safety feature diminishing the possibility that head 20 and 20', will overrun their intended range of movement and cause damage.

To vary the ratio of the fluids dispensed from cylinders 12 and 12' motor 52 is actuated along with motor 30. Through the power train described, this causes secondary input shaft 72 to be turned in one direction and secondary input shaft 74 to be turned at the same rate in the opposite direction. The result is an increase in the turning rate of the one screw 22 by a predetermined amount and a reduction in the turning rate of the other screw 22' by the same amount. One cross head 20 and its piston 14 is thereby caused to advance through a greater distance during the dispensing stroke than the other cross head 20' and its piston 14' so that a greater amount of fluid is dispensed out of one cylinder 12 than out of the other cylinder 12'.

A typical relative positioning of cross heads 20 and 20' at the end of unlike dispensing strokes is illustrated in dotted lines in the drawing. Tripping of switch 78 at the end of the dispensing stroke reverses both motors 30,52, and cross heads 20 and 20' and their pistons 14 and 14' in a sequence of steps described below, are retracted to the solid line position shown in the drawing.

Motors 30 and 52 accelerate from zero r.p.m. to operating speed at slightly different rates. This causes pistons 14 and 14' to get slightly out of phase during each cycle of dispensing and retraction. The phase differences in successive cycles of operation are cumulative. Without correction, the accumulated phase differences would ultimately cause apparatus 10 to malfunction.

A phase correction is effected during each retracting stroke of pistons 14 and 14' by operating motor 52 at a higher rate during the retracting stroke than during the dispensing stroke. This increases the differential input of shafts 72,74 into transmissions 28 and 28', causing that cross head 20 or 20' which advanced the farther during the dispensing stroke to catch up quickly with the other cross head 20 or 20' during the retracting stroke. When the distance between the two cross heads has diminished substantially to zero, switch 86 is tripped by finger 88, thereby de-actuating motor 52. Thereafter, motor 30, by itself, homes the two cross heads and pistons together, thereby eliminating any phase difference which may have occurred earlier in the cycle. Brake 63 is operated to halt motor 52 and the components driven thereby both at the end of the dispensing stroke and during the retracting stroke when motor 52 is de-actuated.

When switch 80 is tripped by the cross head 20, motor 30 is de-actuated and the cycle is complete. Switch 86 and its associated circuitry are arranged so that the phase correction occurs during each retracting stroke regardless of which cross head 20 or 20' advances the farther during the dispensimg stroke of the cross heads and pistons.

Either cross head 20 or 20' and its piston 14 or 14' can be made to move farther than the other during the dispensing stroke by selecting the direction of operation of motor 52 and consequent directions of rotation of secondary input shafts 72,74. The difference between the lengths of the dispensing strokes of pistons 14 and 14' is controlled by regulating the speed of operation of motor 52. Thus, by merely manipulating the electric controls for motor 52, fluids can be dispensed from cylinders 12 and 12' at a one to one ratio and at many other ratios. Moreover, if desired, the dispensing ratio can be changed in mid-dispensing stroke of pistons 14 and 14' by changing the rate of operation of motor 52. In a typical apparatus 10 utilizing cylinders 12 and 12' of the same diameter, fluids can be dispensed from either cylinder at four times the rate of dispensing from the other cylinder.

The mechanical components of apparatus 10 and the various controls therefor are conventional. In a typical apparatus 10 motor 30 is a 15 horse power alternating current electric motor and motor 52 is a 2 horse power, direct current, variable speed, electric motor. It is within the invention, however, to use forms of motive force other than electric motors. While the apparatus illustrated has only two cylinders 12 and 12', it will be obvious that greater numbers of cylinders could be incorporated into one apparatus, each having an associated differential transmission and drive means for effecting relative movement between the cylinder and its piston. While in the apparatus illustrated motor 52 is at rest for a one to one dispensing ratio it is also within the invention to design the apparatus so that a one to one dispensing ratio is obtained instead while motor 52 is operating.

We claim:

1. In an apparatus having a plurality of cylinder and piston assemblies each operable upon relative movement of its piston at a given rate to dispense a fluid from said cylinder at a predetermined rate, and means for varying the rates of said movement in the respective assemblies for varying the ratio of dispensing fluids from said cylinders, improved structure which comprises, a differential transmission associated with each of said assemblies and having an output connected for producing said relative movement of its piston, each said differential transmission having a first input and a second input, first motor means drivingly connected with said first input of each of said differential transmissions, and second motor means drivingly connected with power transmitting means having a plurality of output means each connected with a separate one of said second inputs of said differential tranmissions for varying the rates at which said differential transmissions drive their respective assemblies, each said second input being responsive to variations in the direction and rate of operation of said second means.

2. The structure defined in claim 1 wherein each said second input is zero when said second motor means is at rest.

3. The structure defined in claim 2 wherein said first motor means comprises an alternating electric current motor and said second motor means comprises a direct current electric motor, said power transmitting means comprising a gear box, and each said output means comprises a rotatable shaft.

4. The structure defined in claim 1 wherein said first motor means comprises an alternating current electric motor and said second motor means comprises a direct current electric motor.

5. The structure defined in claim 1 wherein said power transmitting means comprises a gear box, and each of said output means comprises a rotatable shaft.

6. The structure defined in claim 1 which also comprises indicating means operable to indicate the difference between the extent of said relative movements of said pistons in said assemblies upon operation of both of said motor means in the direction for dispensing such fluids, said motor means being reversible to effect said relative movement in said assemblies in a return direction following said dispensing, said second motor means being operable at a rate higher than that required for said dispensing so that when reversed and operated at said higher rate said difference is diminished at an accelerated rate, and control means associated with said indicating means operable to deactuate said second motor means responsive to diminution of said difference to substantially zero.

7. The structure defined in claim 6 wherein said indicating means includes a plurality of elements, each of which is mounted for movement through a distance proportional to said relative movement of a piston in a said assembly.

8. The structure defined in claim 7 wherein said first and second motor means comprise electric motors, said control means including a switch actuating means carried by one of said elements and tripped by another of said elements responsive to said diminution of said difference to substantially zero.

9. The structure defined in claim 7 wherein each of said elements is mounted to follow directly said relative movement of a piston in its respective assembly.

10. The structure defined in claim 9 wherein said element is mounted for movement with one of said cylinder or said piston.

11. The structure defined in claim 10 wherein each said element is mounted for movement with a said piston.

12. The structure defined in claim 11 which also comprises a drive connection between each said transmission and its respective assembly, said drive connection including a member connected to advance and retract said piston within said cylinder, said element being mounted on said member of said drive connection.

13. The structure defined in claim 12 wherein each said second input is zero when said second motor means is at rest, said first motor means comprising an alternating current electric motor and said second motor means comprising a direct current electric motor, said power transmitting means comprises, a gear box, and each said output means comprises a rotatable shaft, said control means including switch actuating means carried by one of said elements and tripped by another of said elements responsive to diminution of said difference to substantially zero.

* * * * *